No. 818,309. PATENTED APR. 17, 1906.
C. W. STONE.
INTERLOCKING SWITCH.
APPLICATION FILED OCT. 4, 1904.
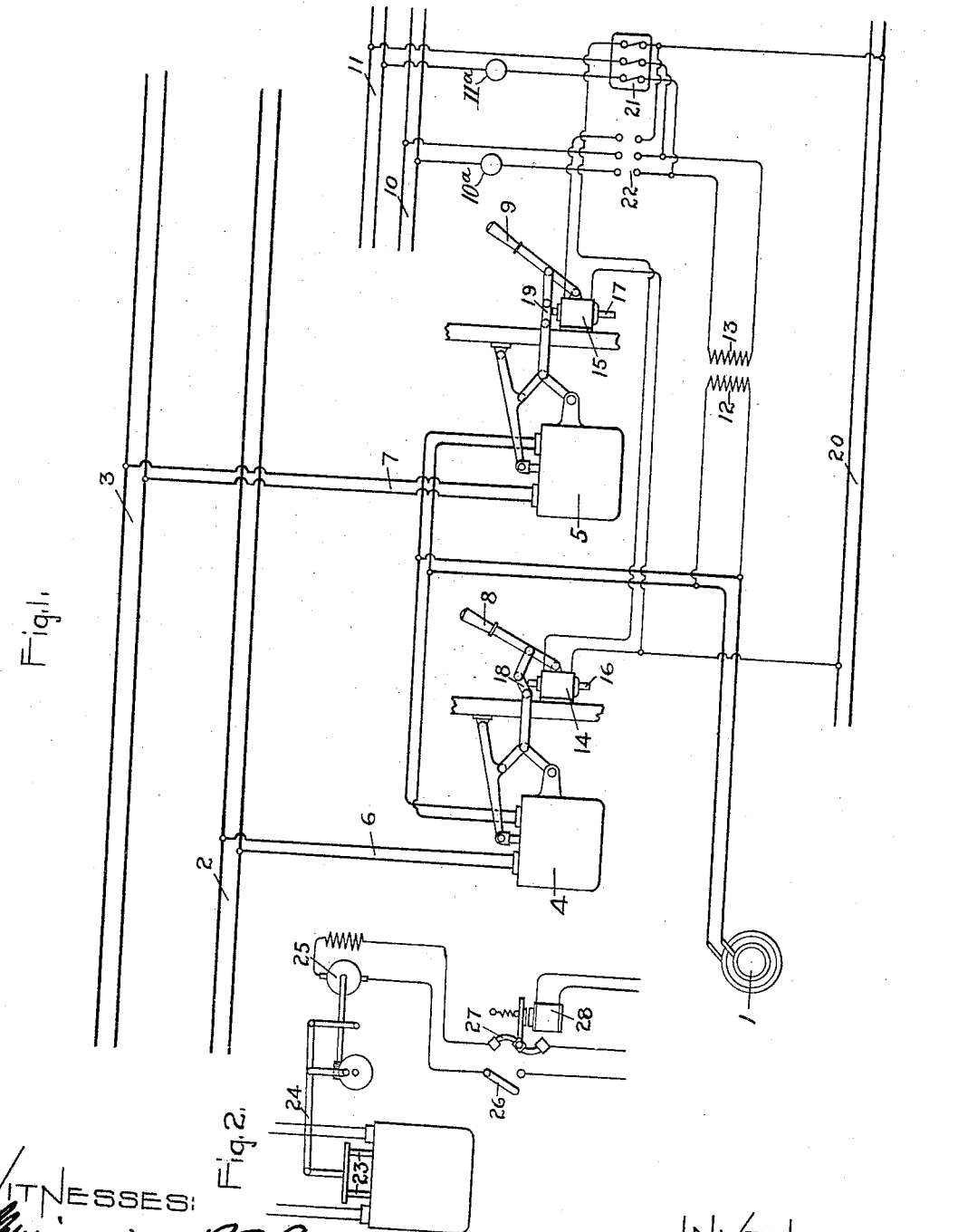
WITNESSES:
Benjamin B Hull
Helen Orford
INVENTOR:
Charles W. Stone,
by Albert G. Davis
Atty.

UNITED STATES PATENT OFFICE.

CHARLES W. STONE, OF SCHENECTADY, NEW YORK, ASSIGNOR TO GENERAL ELECTRIC COMPANY, A CORPORATION OF NEW YORK.

INTERLOCKING SWITCH.

No. 818,309.

Specification of Letters Patent.

Patented April 17, 1906.

Application filed October 4, 1904. Serial No. 227,173.

*To all whom it may concern:*

Be it known that I, CHARLES W. STONE, a citizen of the United States, residing at Schenectady, county of Schenectady, State of New York, have invented certain new and useful Improvements in Interlocking Switches, of which the following is a specification.

This invention relates to means for controlling switches for connecting alternating-current generators with bus-bars.

It is applicable to either single or multi-phase systems; but for the sake of simplicity it will be shown and described as used with a single-phase circuit.

It has especial reference to systems in which two or more sets of bus-bars are employed and a plurality of generators, each capable of connection with any desired set of buses by means of branch circuits each controlled by a switch.

When a machine has been speeded up into synchronism with the machines feeding a particular set of bus-bars, it is of vital importance that the right switch be closed to connect the machine with those bus-bars and no others.

The object of the invention is to prevent the attendant from closing the wrong switch by rendering said switch inoperative for the time being.

In the accompanying drawings, Figure 1 is a diagram of circuits and apparatus embodying my invention. Fig. 2 illustrates a modification.

The alternating-current generator 1 can be connected with either set of bus-bars 2 3 by means of suitable main switching apparatus, such as the separate oil-switches 4 5, each controlling a branch line 6 7 between the generator and the respective sets of bus-bars. If desired, a double-throw switch may be substituted for the two switches 4 5. The switches shown in Fig. 1 are operated by handles 8 9, which are preferably connected mechanically with the levers which actuate the movable switch-contacts.

One or more sets of synchronizing-buses 10 11 run along the switchboard. Each set is provided with some kind of a synchronism-indicator, such as the synchronizing-lamps 10ª 11ª, and is suitably connected with the generator. In the high-potential system shown in the drawings a potential step-down transformer has its primary 12 connected across the generator-leads and its secondary 13 connected to both sets of synchronizing-buses by branch leads.

The construction and arrangement so far set forth are well known and are not of my invention. What I have invented will now be described.

Adjacent to the handles of the switches 8 9 are electromagnets 14 15, whose movable cores 16 17 are arranged to disable the handles when the magnets are energized. This may be effected by some kind of locking device; but in the drawings I have shown the handles connected with the switch-levers by toggles 18 19, which are broken when the magnets are energized. The magnets are connected in multiple across any suitable source of current, such as the exciter-mains 20, which supply direct current to the field-coils of the generators. In circuit with the magnet 14 is one pole of a multiple-pole switch, such as the three-pole switch 21, the other poles of which control a synchronizing-circuit—say of the bus-bars 11. The magnet 15 is similarly connected with one pole of a three-pole switch 22, whose other poles control another synchronizing-circuit—say at the bus-bars 10.

When one of the synchronizing-circuits is closed—say at the switch 21—the synchronism-indicator connected with the buses 11 will show the relation between the generator 1 and any or all machines feeding the main bus-bars 3. At the same time the closing of the switch will energize the magnet 14 and cause its core 16 to trip the toggle 18 or otherwise disable the switch 4, so that it is rendered inoperative. Therefore, when the attendant goes to connect the machine 1 with the main bus-bars he cannot accidentally connect it with the bus-bars 2, because the handle 8 will not work the switch 4. He is thus not only warned that he has made a mistake, but is obliged to close the right switch to connect the machine with the buses 3, which are those with which he has been synchronizing.

In Fig. 2 is illustrated another embodiment of my invention as applied to an electrically-operated switch. The plungers 23 are actuated by a lever 24, which is raised and lowered by an electric motor 25, whose circuit is controlled by a hand-switch 26. An auxiliary switch 27 in the same circuit is controlled by an electromagnet 28, which corresponds with one of the magnets 14 or 15 in Fig. 1 and is controlled by a switch 21 or 22 in the same manner. When the circuit of the magnet 28 is closed, it opens the switch 27 and renders the motor inoperative.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. The combination with an alternating-current generator, of two or more sets of main bus-bars, one or more sets of synchronizing bus-bars, main switches and synchronizing-switches, and means for interlocking said switches so that when a given synchronizing-switch is closed, none but the right main switch can be closed.

2. The combination with an alternating-current generator, of two or more sets of bus-bars, main switching apparatus for connecting said generator to said bars, and means for automatically preventing the closing of a given part of said apparatus when the machine has been synchronized with a set of bus-bars not connected with said part.

3. The combination with an alternating-current generator, of two or more sets of bus-bars, main switching apparatus for connecting said generator to said bars, electromagnets for disabling respective parts of said apparatus, and means for closing the circuit of all said magnets except one, when the machine is being synchronized with the bus-bars connected with the part that is not disabled.

4. The combination with an alternating-current generator, of two or more sets of bus-bars, separate main switches for connecting said generator to said bars, electromagnets for disabling said switches, one or more synchronizing-circuits, and switches for closing any one of them, said switches having poles which energize all the electromagnets except the one controlling the main switch which will connect the generator with the buses with which it has been synchronized.

5. The combination with an alternating-current generator, of two or more sets of bus-bars, separate main switches for connecting said generator to said bars, toggles for actuating said switches, a tripping-magnet adjacent to each toggle and adapted to break it when energized, one or more sets of synchronizing-circuits, and a multiple-pole switch for each of said circuits, one of whose poles is in circuit with all the electromagnets except the one controlling the switch that is to be closed.

In witness whereof I have hereunto set my hand this 23d day of September, 1904.

CHARLES W. STONE.

Witnesses:
 BENJAMIN B. HULL,
 HELEN ORFORD